United States Patent
Lehtonen

(10) Patent No.: US 6,209,523 B1
(45) Date of Patent: Apr. 3, 2001

(54) CONTROL AND SAFETY VALVE ARRANGEMENT IN A FUEL FEEDING SYSTEM

(75) Inventor: Kai Lehtonen, Vaasa (FI)

(73) Assignee: Wartsila NSD OY AB, Helsinki (FI)

( * ) Notice: Subject to any disclaimer, the term of this patent is extended or adjusted under 35 U.S.C. 154(b) by 0 days.

(21) Appl. No.: 09/323,729

(22) Filed: Jun. 1, 1999

(30) Foreign Application Priority Data

Jun. 8, 1998 (FI) .......................................... 981306

(51) Int. Cl.[7] .......................... F02B 77/08; F02D 41/22; F02M 37/00
(52) U.S. Cl. ...................... 123/467; 123/447; 123/198 D
(58) Field of Search ................................. 123/467, 506, 123/456, 447, 198 D

(56) References Cited

U.S. PATENT DOCUMENTS

| | | | |
|---|---|---|---|
| 5,727,525 | * 3/1998 | Tzuzuki ............................. | 123/447 |
| 6,085,728 | * 7/2000 | Grosser et al. ..................... | 123/447 |

FOREIGN PATENT DOCUMENTS

| | | |
|---|---|---|
| 196 26 689 | 7/1996 | (DE) . |
| 196 40 826 | 10/1996 | (DE) . |
| 411062773 | * 3/1999 | (JP) . |

* cited by examiner

*Primary Examiner*—Tony M. Arganbright
*Assistant Examiner*—Arnold Castro
(74) *Attorney, Agent, or Firm*—John Smith-Hill; Smith-Hill and Bedell

(57) ABSTRACT

A control and safety valve arrangement in a fuel feeding system of an internal combustion engine, especially a large diesel engine, in which fuel is pumped from a fuel tank at least to one common pressure accumulator unit (1) and is fed therefrom under high pressure to be injected at least into two cylinders of the engine. The pressure accumulator unit (1,1*a*) is connect to the fuel tank with a separate return flow line (5,6,7), which is provided with valve means provided with two separate control arrangements operationally independent on each other so that the pressure accumulator unit (1) can be connected to the fuel tank by means of a first control arrangement under the influence of a separate control pressure when necessary and in addition by means of a second control arrangement in case the pressure in the pressure accumulator unit (1) exceeds a certain selected limit value.

16 Claims, 2 Drawing Sheets

CONTROL AND SAFETY VALVE ARRANGEMENT IN A FUEL FEEDING SYSTEM

Figure 1:
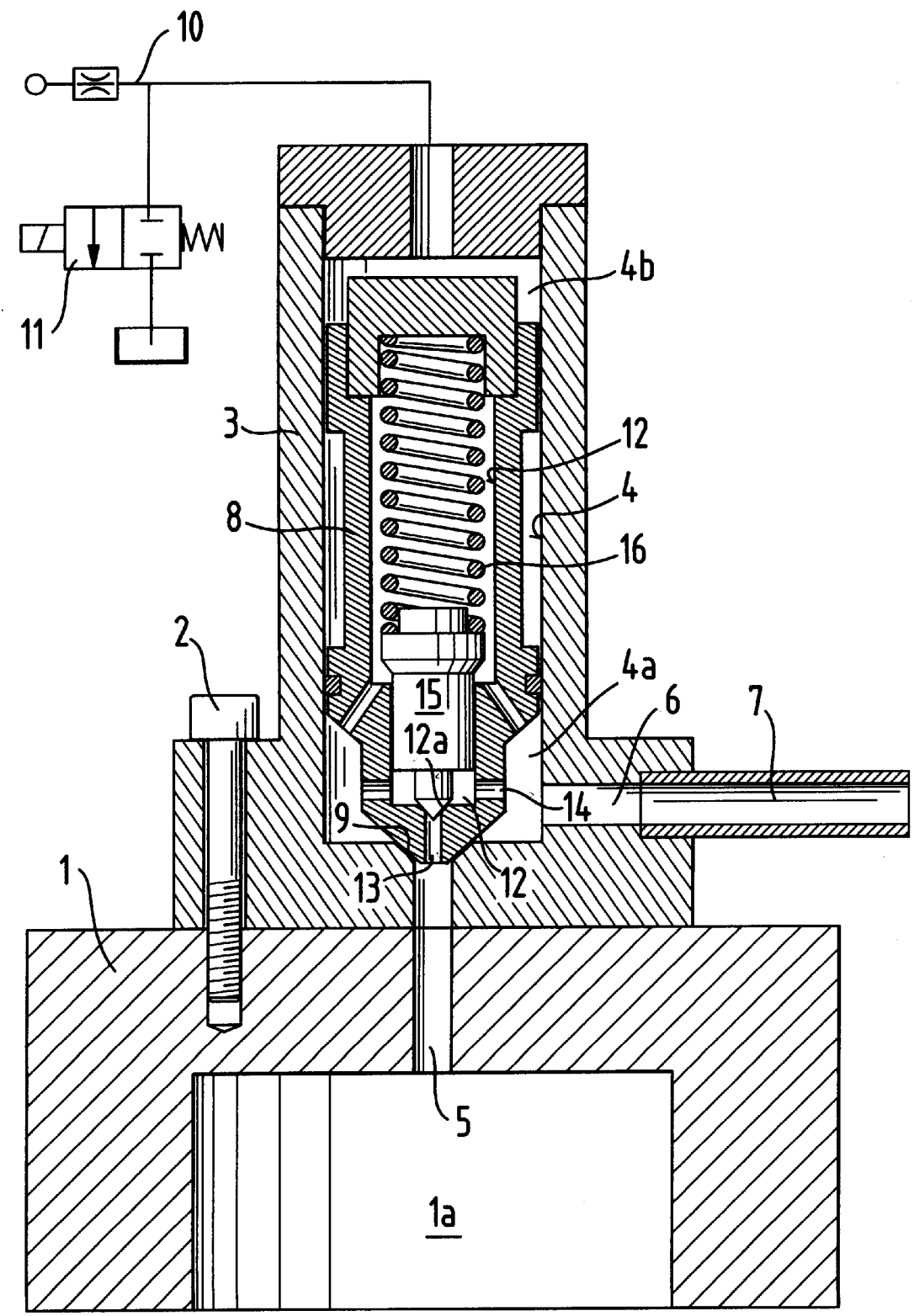

The invention relates to a control and safety valve arrangement in a fuel feeding system.

In common pressure injection systems or common rail systems utilized for feeding fuel in internal combustion engines there is need for valve arrangements of different kinds. Especially when heavy oil or the like is used as fuel the viscosity of the fuel has to be decreased sufficiently before the engine is started so as to make the injection of the fuel into a cylinder possible. This is accomplished by circulating the fuel through the fuel feeding system so that it is warmed up. On the other hand a common rail system requires also a valve function for restricting the pressures used and a valve, through which the system can be unpressurized in connection with stopping of the engine or in an emergency situation. Thus, implementation of these functions requires normally three different valve functions and separate valves therefor.

The aim of the invention is to provide a new valve arrangement which is advantageous as to its construction and by means of which the valve functions mentioned above can at least partly be integrated in a common construction for obtaining a compact entity which is advantageous as to its costs. A further aim is that the valve arrangement can be applied especially in fuel feeding systems utilizing heavy fuel oil as a fuel.

In a control and safety valve arrangement according to the invention the pressure accumulator unit is connect to the fuel tank with a separate return flow line, which is provided with valve means provided with two separate control arrangements operationally independent on each other so that the pressure accumulator unit can be connected to the fuel tank by means of a first control arrangement under the influence of a separate control pressure when necessary and in addition by means of a second control arrangement in case the pressure in the pressure accumulator unit exceeds a certain selected limit value. The solution makes it possible to implement different valve functions required in common rail systems by making use of common structures.

In case said first control arrangement comprises a precontrol valve, preferably a solenoid valve, for controlling said control pressure, the control pressure can be connected and disconnected quickly and exactly according to need. In practice said control pressure can with advantage be hydraulically implemented, whereby it can be for instance as a part of a servo oil circuit of the engine, which is generally needed in any event for controlling the operation of the fuel injection valves.

Said second control arrangement may simply comprise a valve spring, the spring force and prestress of which determine the opening pressure in accordance with said limit value.

In case the valve means are located in a common valve unit fixed to the pressure accumulator unit and comprising a valve chamber, through which said return flow line is led, a space saving compact construction is obtained.

In an advantageous embodiment of the invention the return flow line is provided with two valves arranged functionally in successive order and of which the first valve in the flow direction is controlled by said first control arrangement and located in said valve chamber. The latter valve in the flow direction is controlled by said second control arrangement so that its opening force is smaller than that of the first valve in the flow direction. Hereby the latter valve may serve as a pressure restricting valve independent on the operations of the first valve.

A valve member of the first valve can be arranged to divide said valve chamber into two parts isolated from each other so that the first chamber part forms a part of said return flow line and the second chamber part is connected to the pressure to be controlled by means of the precontrol valve. The valve member of the first valve may in addition comprise a chamber, which can be connected on the one hand to the pressure accumulator unit and on the other hand to said first chamber part. In this case a valve member of the latter valve, a seat surface of the valve and a valve spring can be located in said chamber in the valve member so that normally it closes the connection from the pressure accumulator unit through said first chamber part into the fuel tank.

In another embodiment of the invention the valve means include a valve member, which in its closed position closes said return flow line and which is located in said valve chamber. In this case said first control arrangement comprises a guiding member, which is movable under the influence of the pressure to be controlled by means of the precontrol valve between a position closing the valve member and a position opening the valve member, and said second control arrangement comprises a valve spring, against the force of which the valve member can be pressed. In this case the valve spring can with advantage be supported to said guiding member at its end opposite to the valve member so that the guiding member acts on the valve member through the valve spring.

The guiding member may be provided with a shaft part which is arranged inside the valve spring. Then the end of the guiding member at the side of the valve member can be provided with a turnable nut for adjusting the prestress of the valve spring.

The valve spring and the guiding member may in this case be located in a second chamber which is separated from said valve chamber by means of the valve member.

Figure 2:
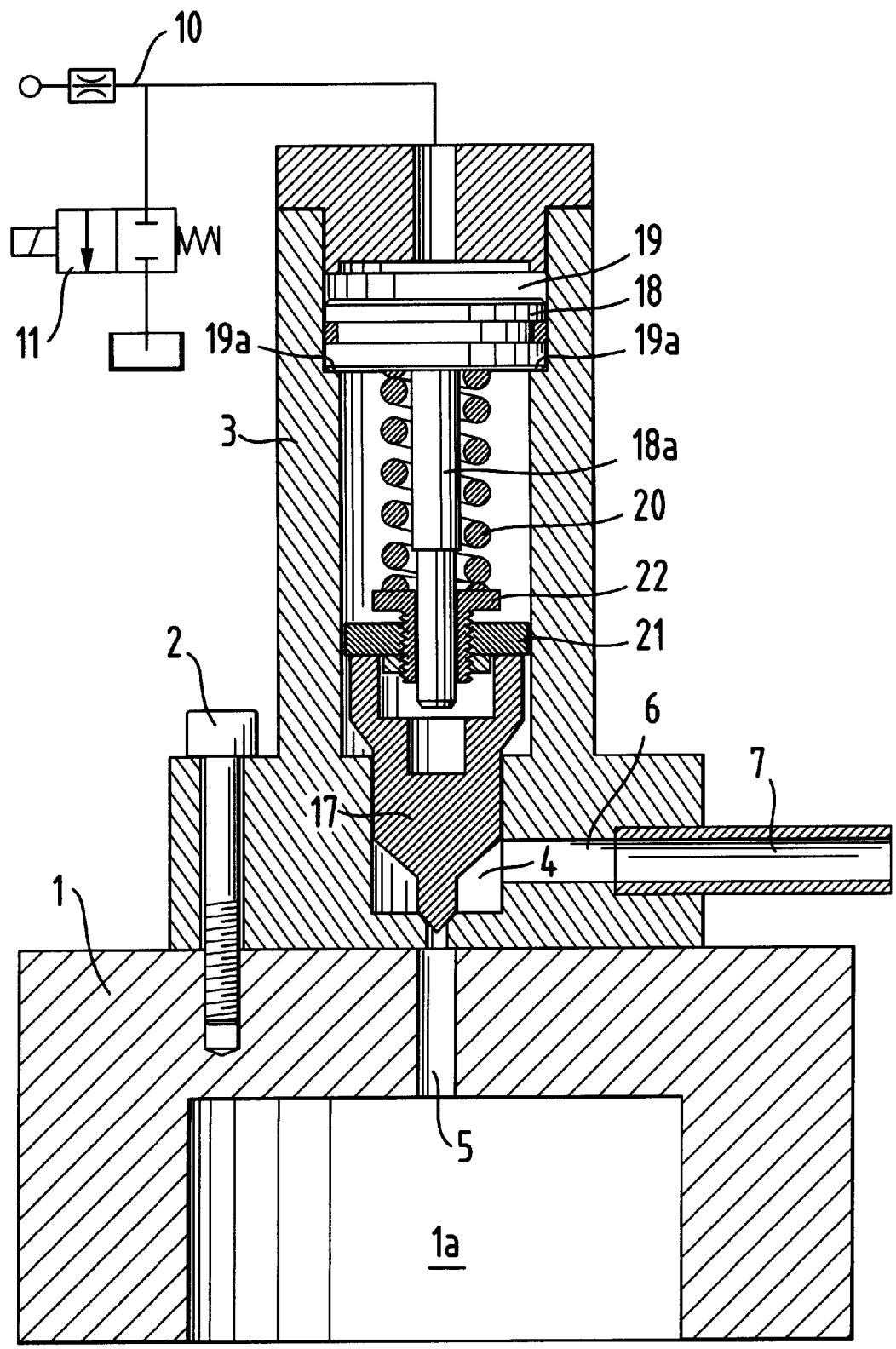

In the following the invention is described, by way of example only, with reference to the attached drawings, in which FIG. 1 shows one embodiment of a valve arrangement according to the invention as a section, and FIG. 2 shows another embodiment of a valve arrangement according to the invention as a section.

In the drawings 1 indicates a common pressure accumulator unit included in a fuel feeding system of an engine and from which the fuel is injected further in a way known as such at least into two cylinders of the engine (not shown). A valve unit 3 including a valve chamber 4 is fixed by means of screw bolts 2 to the common pressure accumulator unit 1. A pressure space 1a in the common pressure accumulator unit 1 is connected by means of a duct 5 to the valve chamber 4 and from there further through a duct 6 and a pipe 7 into a fuel tank (not shown). In addition to this return flow line the pressure space 1a is naturally in connection with the fuel tank through a fuel feeding line and pumping means in association therewith etc. Since these, however, do not relate to this invention, they are not shown here. When the engine is running the pressure in the pressure space 1a may typically be for instance in the order of 1200 bar.

In the embodiment of FIG. 1 the valve chamber 4 includes a first valve comprising a valve member 8 and a valve seat 9. The valve member 8 divides the valve chamber 4 into two parts 4a and 4b, which are isolated from each other.

In order to control the valve the chamber part 4b is connected to a servo oil circuit 10 of the engine, whereby the control pressure normally closing the valve is typically in the order of 100 bar. Opening and closing of the valve takes place by means of a precontrol valve 11, which is preferably a solenoid valve. Depending on the operating position of the control valve 11 the chamber part 4b either is under the control pressure, whereby the valve member 8 is in the closed position shown in FIG. 1 and, thus, the valve is closed, or there is no pressure in the chamber part 4b, whereby the valve is respectively open, and the pressure space 1a is in connection through the chamber part 4a with the pipe 7 and thus with the fuel tank (not shown).

The valve member 8 includes a chamber 12, which can be connected through a duct 13 to the duct 5 and further to the pressure space 1a and through a duct 14 to the chamber part 4a and further through the duct 6 and the pipe 7 to the fuel tank. Located in the chamber 12 there is another valve, a valve member 15 of which is urged by means of a valve spring 16 against a valve seat 12a included in the chamber 12. This valve closes the duct 13 and thus the connection of the pressure space 1a to the fuel tank when the influence of the pressure prevailing in the pressure space 1a on the valve member 15 is smaller than the closing force of the valve spring 16 acting on it respectively. Hereby this valve serves as a pressure limiting valve. The spring force of the valve spring 16 is selected so that it is smaller than the force of the pressure normally prevailing in the chamber part 4b and acting on the valve member 8, so that said second valve is opened before said first valve. As is apparent from FIG. 1 each valve may open independent on one another.

In contrast to the description above the embodiment of FIG. 2 includes only one valve member 17, which is located in the valve chamber 4 and normally closes the connection of the pressure space 1a through the return flow line to the fuel tank. There are two separate control arrangements provided for the valve member 17. The first control arrangement comprises a guiding member 18 arranged in a chamber 19 of the valve unit 3 and movable between its positions of opening and closing the valve under the influence of the pressure controlled by the precontrol valve 11 in an analogous way with regard to the description above. In FIG. 2 the guiding member 18 is in its closing position, whereby it is pressed against shoulders 19a in the chamber 19. In its not shown opening position the guiding member 18 is respectively not pressed against the shoulders 19a.

The second control arrangement includes a valve spring 20, which acts on the valve member 17 through a plate-like element 21. The other end of the valve spring 20 is supported to the guiding member 18. Thus the guiding member 18 acts on the valve member 17 through the valve spring 20. The guiding member 18 comprises additionally a shaft part 18a, at the end of which there is arranged a turnable nut 22 by means of which the prestress of the valve spring 20 may be adjusted.

Also in the embodiment of FIG. 2 the control of the valve member 17 provided by the valve spring 20 is completely independent on other control arrangements and can be utilized for providing the pressure limiting function. Although the guiding member 18 is only indirectly through the valve spring 20 connected to the valve member 17, by means of it, however, it is possible to provide a separate valve function under the control of the precontrol valve 11. Thus when there is no pressure in the chamber 19 the guiding member 18 moves together with the spring 20, the element 21 and the valve member 17 into a position, in which the connection of the pressure space 1a through the flow line 5, 4, 6 and 7 to the fuel tank is open. In order to secure that the controlling pressure, after connection thereof by the precontrol valve 11 into the chamber 19, is able to cause movement of the guiding member 18 back into its closing position against the shoulders 19a, the upper part of the chamber 19 may also be provided with small shoulders as shown in FIG. 2.

On the basis of the above it is possible in both embodiments to limit the pressure in the pressure space 1a by means of the valve springs 16 or 20 respectively. In addition the pressure space 1a can be connected at any time to the fuel tank of the engine by means of the precontrol valve 11 i.a. in order to circulate fuel for preheating thereof before starting of the engine and in order to unpressurize the high pressure fuel system in an emergency situation very quickly or in a normal situation in connection with stopping of the engine.

In the embodiment of FIG. 1 two flow lines with different diameter are available, whereby for circulation of fuel and for those cases when the fuel feeding system must quickly be unpressurized the flow line with the larger diameter may with advantage be utilized. In the embodiment of FIG. 2 for its part all the valve operations are related to the same flow line, whereby the selection of the diameter of the flow line is a compromise between on the one hand the needs for the circulation of fuel and on the other hand the pressure limiting function and in association therewith the stiffness of the valve spring and the requirement of space. On the other hand in this case only one valve member is required.

The invention is not restricted to the embodiments shown but several modifications are feasible within the scope of the attached claims.

What is claimed is:

1. A valve arrangement for a fuel feeding system of an internal combustion engine, especially a large diesel engine, comprising:

a valve means having a fuel inlet for connecting to a pressure accumulator unit and a fuel outlet for connection to a fuel tank, the valve means including at least a first valve member for controlling flow from the fuel inlet to the fuel outlet, a first control arrangement having a control inlet, the first control arrangement controlling the first valve member in dependence upon fluid pressure at the control inlet, and a second control arrangement for controlling the valve means to open the valve means when pressure at the fuel inlet exceeds a selected limit value, the second control arrangement being independent of the fluid pressure at the control inlet.

2. A valve arrangement according to claim 1, wherein said second control arrangement comprises a valve spring having a force and pre-stress which determine said limit value.

3. A valve arrangement according to claim 1, wherein the valve means includes a second valve member, and said second control arrangement controls the valve means by moving the second valve member between a closed position and an open position.

4. A valve arrangement according to claim 3, comprising a common valve unit which defines a valve chamber in which the first and second valve members are located.

5. A valve arrangement according to claim 4, wherein the first and second valve members are arranged functionally in successive order between the fuel inlet and the fuel outlet, and wherein the first valve member is upstream of the second valve member with respect to flow from the fuel inlet to the fuel outlet.

6. A valve arrangement according to claim 4, wherein the first valve member divides said valve chamber into first and second chamber parts isolated from one another, and wherein the first chamber part is connected to the fuel outlet and the second chamber part is connected to the control inlet.

7. A valve arrangement according to claim 6, wherein the first valve member defines an internal chamber, a first duct connecting the internal chamber to the fuel inlet, and a second duct connecting the internal chamber to said first chamber part, whereby the fuel inlet is connected to the first chamber part, and wherein the second valve member is located in said internal chamber such that the connection from the fuel inlet to the first chamber part is normally closed.

8. A valve arrangement according to claim 1, wherein said valve means defines a valve chamber, the first valve member is located in the valve chamber, and the first control arrangement comprises a guiding member which is movable under the influence of the fluid pressure at the control inlet.

9. A valve arrangement according to claim 8, wherein said second control arrangement comprises a valve spring which is effective between said guiding member and said valve member for urging the valve member towards a closed position.

10. A valve arrangement according to claim 9, wherein said guiding member includes a shaft part arranged inside the valve spring, the shaft part having an end adjacent to the valve member and provided with a turnable nut for adjusting pre-stress of the valve spring.

11. A valve arrangement according to claim 1, wherein said valve means defines a chamber, the first valve member is located in said chamber and divides the chamber into a first chamber part to which the fuel inlet is connected and a second chamber part, and wherein the first control arrangement comprises a guiding member, which is movable under the influence of the fluid pressure at the control inlet and a valve spring which is effective between said guiding member and said valve member for urging the valve member towards a closed position, the guiding member and the valve spring being located in the second chamber part.

12. A fuel feeding system for an internal combustion engine, especially a large diesel engine, comprising a fuel tank, a pressure accumulator unit, a source of control fluid under pressure, and a valve arrangment, the valve arrangement comprising:

a valve means having a fuel inlet connected to the pressure accumulator unit and a fuel outlet connected to the fuel tank, the valve means including at least a first valve member for controlling flow from the fuel inlet to the fuel outlet, a first control arrangement having a control inlet connected to the source of control fluid, the first control arrangement controlling the first valve member in dependence upon fluid pressure at the control inlet, and a second control arrangement for controlling the valve means to open the valve means when pressure at the fuel inlet exceeds a selected limit value, the second control arrangement being independent of the fluid pressure at the control inlet.

13. A fuel feeding system according to claim 12, wherein the valve means includes a second valve member, and said second control arrangement controls the valve means by moving the second valve member from a closed position to an open position.

14. A fuel feeding system according to claim 12, wherein the source of control fluid is a servo oil circuit which supplies hydraulic fluid under pressure to the control inlet.

15. A fuel feeding system according to claim 12, wherein said first control arrangement includes a pre-control valve for controlling the fluid pressure at the control inlet.

16. A fuel feeding system according to claim 15, wherein said pre-control valve is a solenoid valve.

* * * * *